UNITED STATES PATENT OFFICE

2,325,803
CONDENSATION PRODUCTS

Karl Schmidt, Cologne-Mulheim, and Ottmar Wahl, Leverkusen I. G.-Werk, Germany, assignors to General Aniline & Film Corporation, a corporation of Delaware No Drawing. Original application July 28, 1937, Serial No. 156,140. Divided and this application August 20, 1940, Serial No. 353,382. In Germany August 6, 1936

6 Claims. (Cl. 260—248)

The present invention relates to new condensation products, more particularly it relates to condensation products of cyanuric halides with polynuclear aromatic angular hydrocarbons.

The new products are obtained by condensing one molecular proportion of a cyanuric halide with one to three molecular proportions of polynuclear aromatic angular hydrocarbons such as phenanthrene, pyrene, chrysene, perylene. The condensation of one molecular proportion of a cyanuric halide, especially cyanuric chloride, with at least one molecular proportion of one of the above mentioned angular compounds is preferably carried out in the presence of aluminum chloride and, if desired, in the presence of a suitable solvent. Of course, the process may be carried through in such manner that products are obtained which contain the radicals of different angular compounds condensed with the cyanuric nucleus.

The meaning of the term polynuclear aromatic hydrocarbon can be obtained by reference to Beilstein; the fourth edition, vol. 5, will reveal that in the first complete paragraph on page 13, the term "angular" as applied to aromatic hydrocarbons, applies to those polynuclear substances in which the center points of the individual nuclei do not lie in a straight line. It is of course necessary that a hydrocarbon must have at least three nuclei in order to be angular. The reverse is of course not true for an anthracene contains three carbon nuclei the centerpoints of which are all on one straight line.

The new condensation products possess among others the property of dyeing solid and liquid hydrocarbons, oils, and waxes; they are particularly distinguished by the property of producing an intensive fluorescence when dissolved in minute quantities in liquid hydrocarbons such as gasoline, benzene and so on.

The following examples illustrate our invention without, however, restricting it thereto, the parts being by weight.

Example 1

18.2 parts of cyanuric chloride and 20.2 parts of pyrene are dissolved in 200 parts of dry benzene and, while stirring the solution for one hour at about 25° C., anhydrous aluminum chloride is introduced. Hydrochloric acid is evolved. After about 12 hours condensation is complete. The separated condensation product is filtered with suction and digested with water until there is no trace of aluminum; then it is carefully dried.

The yellow condensation product corresponding to the formula:

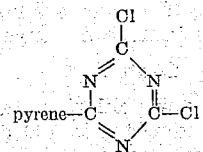

exhibits in benzene an intense bluish-green fluorescence, and in benzine a blue fluorescence and is suitable for providing such hydrocarbons with identification colorings.

Example 2

9.2 parts of cyanuric chloride and 8.9 parts of phenanthrene are dissolved in 100 parts of dry benzene, and over a period of 2 hours at room temperature anhydrous aluminum chloride is introduced. The reaction mixture quickly assumes a deep reddish-brown coloration while hydrochloric acid escapes. After 12 hours the separated precipitate is filtered with suction and treated as described in Example 1.

The greyish-green condensation product corresponding to the formula:

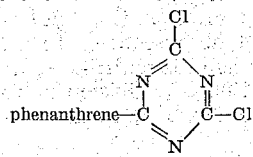

dissolves in benzine hydrocarbons with an intense violet fluorescence, in benzene with a bluish fluorescence.

Example 3

11.4 parts of chrysene and 9.2 parts of cyanuric chloride are dissolved in 100 parts of dry benzene and 60 parts of nitrobenzene, and over a period of about 1½ hours there are introduced at room temperature 10 parts of anhydrous aluminum chloride. Then the reaction mixture is slowly heated to 85° C., which temperature is maintained for some hours. The solvent is distilled off in vacuo and the residue is digested with cold water until no trace of aluminum can be detected, and then dried.

The condensation product corresponding to the formula:

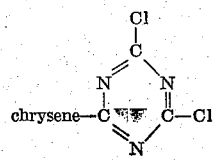

exhibits in benzine hydrocarbons a dull bluish-violet fluorescence and in benzene a brownish-yellow fluorescence.

*Example 4*

4.6 parts of cyanuric chloride and 6.2 parts of perylene are introduced into 150 parts of carbon disulfide, and, while stirring, 10 parts of anhydrous aluminum chloride are added at about 20° C. The whole mixture is stirred for 12 hours at 20–25° C. The condensation product corresponding to the formula:

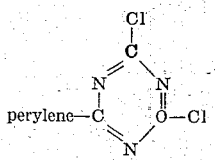

is filtered with suction, digested with water until there is no longer any trace of aluminum detectable, and then dried.

The benzene solution is orange colored; in great dilution the fluorescence is yellowish-green.

*Example 5*

9.2 parts of cyanuric chloride and 25.2 parts of perylene are introduced into 100 parts of nitrobenzene, and, while stirring the mixture, there are added thereto at room temperature 20 parts of anhydrous aluminum chloride. The mixture is slowly heated to 150° C., which temperature is maintained for 3 hours. After cooling the mixture is diluted with xylene so that the condensation product precipitates. The precipitate is filtered with suction, washed with ligroin and dried.

The condensation product corresponding to the formula:

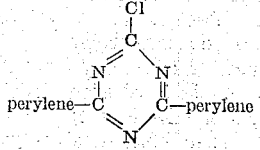

dissolves in benzene with a reddish-brown coloration; in great dilution the solution displays a yellowish-green fluorescence. In a ligroin solution the fluorescence is bluish-green.

This application is a division of our copending application Ser. No. 156,140, filed July 28, 1937.

We claim:

1. Condensation products corresponding to the general formula:

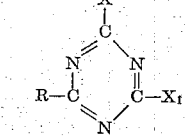

wherein R stands for the radical of a polynuclear aromatic angular hydrocarbon and X and $X_1$ stand for one of the group consisting of halogen and the radical of a polynuclear aromatic angular hydrocarbon.

2. Condensation products corresponding to the general formula:

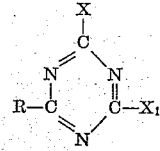

wherein R stands for the radical of a polynuclear aromatic angular hydrocarbon and X and $X_1$ stand for one of the group consisting of chlorine and the radical of a polynuclear aromatic angular hydrocarbon.

3. Condensation products corresponding to the general formula:

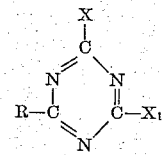

wherein R stands for the radical of perylene and X and $X_1$ stand for one of the group consisting of chlorine and the perylene radical.

4. Condensation product corresponding to the formula:

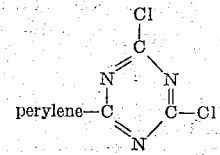

5. Condensation product corresponding to the formula:

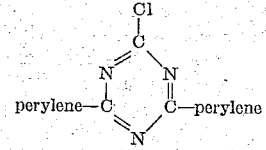

6. Condensation product corresponding to the formula:

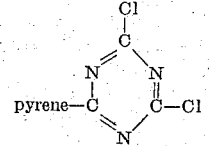

KARL SCHMIDT.
OTTMAR WAHL.